Jan. 17, 1967     V. SANGIMINO     3,298,731

MULTI-PURPOSE VEHICLE

Filed July 12, 1965     5 Sheets-Sheet 1

VITO SANGIMINO
INVENTOR

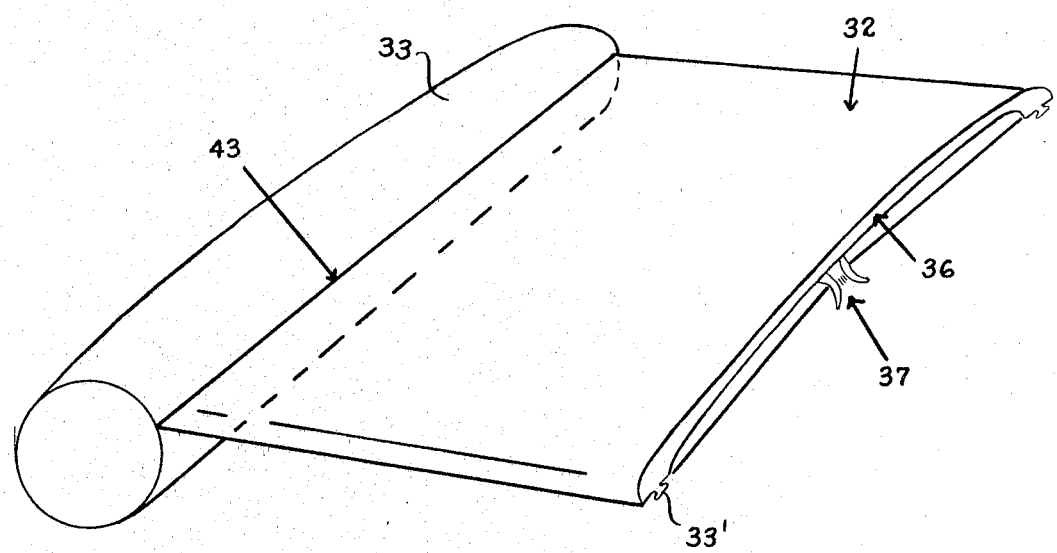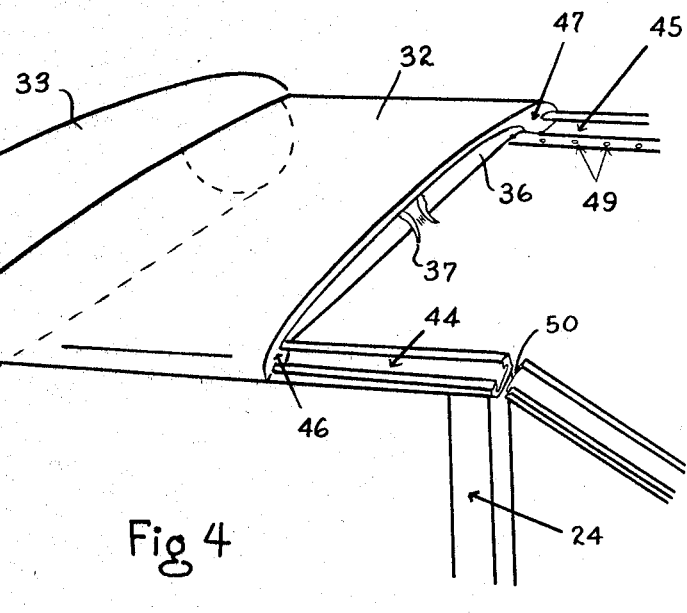

Jan. 17, 1967   V. SANGIMINO   3,298,731
MULTI-PURPOSE VEHICLE
Filed July 12, 1965   5 Sheets-Sheet 4

VITO SANGIMINO
INVENTOR

United States Patent Office 3,298,731
Patented Jan. 17, 1967

3,298,731
MULTI-PURPOSE VEHICLE
Vito Sangimino, 268 Bay 20 St., Brooklyn, N.Y. 11214
Filed July 12, 1965, Ser. No. 478,520
1 Claim. (Cl. 296—99)

This application is a continuation-in-part of my copending U.S. patent application, Serial No. 284,896, filed June 3, 1963, now abandoned.

The present invention relates to vehicles and more particularly to automobiles of the station wagon type.

It is an object of the present invention to provide a station wagon having a convertible top which will not only operate to cover or expose the passenger area of the vehicle as does a normal convertible top, but in addition will enable the operator to select any desired partially covered or partially exposed position.

Another object of the present invention is to provide a convertible top which can retract into either the front or rear of the vehicle, to cover or expose all or any part of the passenger area of the vehicle.

Still another object of the present invention is to provide a vehicle which can be readily converted from a station wagon to a convertible or to a pickup truck.

These and other objects of the present invention will become apparent as the description proceeds.

Briefly, the objects of the present invention are obtained by providing a station wagon having a roller affixed to the upper portion of the front windshield. The roller which contains a convertible roof cover communicates with channels or tracks which run above the windows along the top portion of each side of the vehicle. A convertible roof cover is fixed to and wound around the roller. Stops are provided along the channels or tracks by means of which the roof cover may be arrested at any desired point. The channels or tracks themselves are sectioned and hinged so they may be folded against the adjacent roof support posts. The roof frame support posts can then be retracted into the side of the car or into a tubular member between the car doors. The support posts will most conveniently be located so they may be retracted into recesses located between adjoining doors. When the top is completely lowered and support posts fully retracted, the vehicle has the appearance of a conventional convertible automobile.

The present invention will now be explained in detail with reference to the drawings in which:

FIGURES 2 and 3 are detail perspective views of the roller casing.

FIGURE 4 is a detail perspective view showing the convertible roof cover mounted in the front roller casing.

Figure 1:
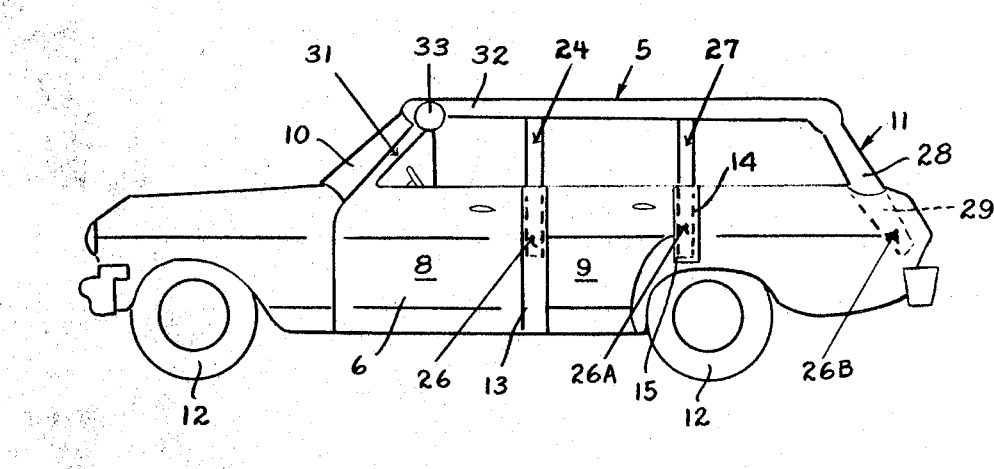
FIGURE 1 is a side elevation of the vehicle according to the present invention.
Figure 2:
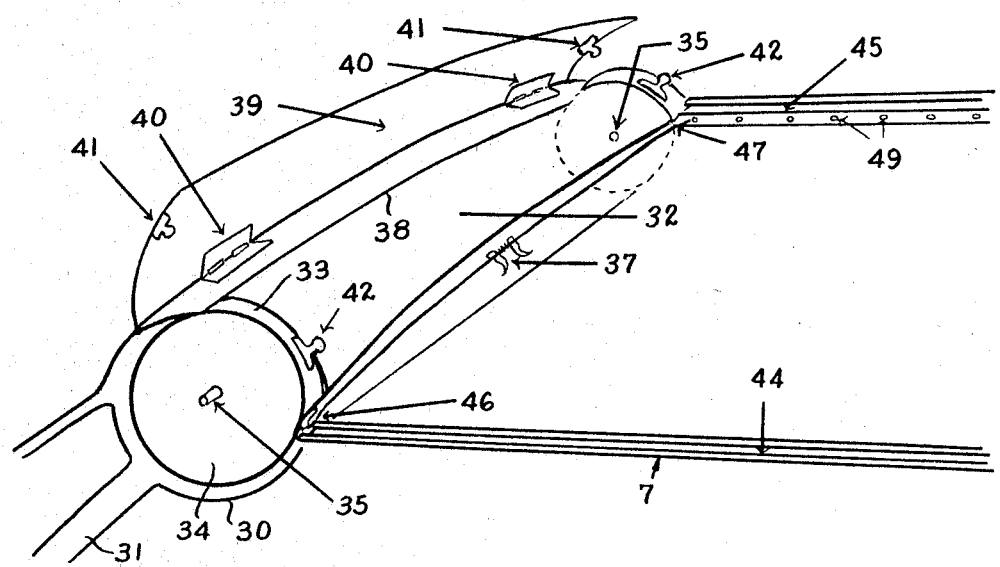

Referring now in detail to the various views of the drawings, in FIGURE 1 there is shown a multipurpose vehicle in the form of a station wagon 5 with a conventional body 6, a roof frame 7, doors 8 and 9 on each side, a front windshield 10, a rear window or windshield 11 and road wheels 12. Tubular members 13 extend vertically on the outside of the sides of the body between the doors 8 and 9 from the bottom of the body to the top of the doors, and similar tubular members 14 extend vertically on the outside of the sides from the wheel fenders 15 to the top of the doors. The body has sections for passengers and cargo.

The roof frame 7 is supported at its sides by posts 24 and 27 depending from the roof frame 7 extending into the tubular members 13 and 14, through the open top ends thereof, and is supported at its rear by a window assembly comprised of transversely spaced posts 28 having a windshield 11 fixedly mounted therebetween for vertical reciprocation in a transverse recess 29 in the rear of the body and at its front by curved bearing members 30 supported at the top of the posts 31 of the front windshield 10. The roof frame thus will be supported by tubular members and posts at three locations 26, 26A and 26B rearwardly of the front windshield 10.

An important feature of the present invention is a flexible roof cover 32 adapted to be stretched over the roof frame 7. For this purpose, an elongated hollow cylindrical casing 33 is supported on the curved members 30 at the top of the posts 31 of the front windshield, extending across the front of the roof frame. A roller 34 is supported in the casing 33 and extends outwardly through the open ends thereof. Trunnions 35 extend from the ends of the roller for rotatably and removably mounting the roller on the top ends of the posts 31 of the front windshield 10, the trunnions extending into sockets in such top ends. The roller 34 functions somewhat similar to a window shade roller.

The flexible roof cover 32 of any suitable material is wound on the roller. Such material may be thin metal, plastic or fabric. Aluminum is an excellent example of a suitable metal for the roof cover. The end of the roof cover may be attached fixedly or removably to the roller body by any suitable means, such as, clamps, screws, bolts, adhesive or the like and then wound around the roller. The roller is provided with means, e.g. springs, which produce a force tending to wind the roof on the roller, as for instance as shown in FIG. 3 of the United States Patent No. 1,910,075. The leading or free edge 36 of the roof cover 32 has a handle 37 by means of which the roof cover may be pulled along the channel bar constructions, thereby covering or exposing all or any part of the passenger and/or cargo section of the multi-purpose vehicle. The long side edges 32' of the cover 32 are enlarged and formed with depending inverted T-shaped extensions 33' therealong.

The casing 33 is formed with a rectangular shaped opening 38 extending substantially the length of the casing which opening is adapted to be closed by a door 39 secured to the edge wall of the opening by hinges 40 and adapted to be held closed by snap fastener elements 41 on the ends of the door coacting with complementary snap fastener elements 42 on the casing at the ends of the opening. When the door 39 is closed there is a slit 43 defined by the edge of the door and the adjacent edge of the opening 38.

FIGURE 4 shows the roof cover 32 partially extended from the slit 43 front casing 33, the roof cover covering the front portion of the passenger section of the vehicle, and exemplifies the mode of operation of the present invention. The roof cover rides on channel bars 44 and 45 (FIGURE 4) which bars extend along the uppermost portion of each side of the vehicle and which are supported by the roof frame support posts, the channel bars opening upwardly and the extensions 33' ride in the openings. The sides 46 and 47 of the leading edge 36 of the roof cover 32 contain means, e.g., spring pressed prongs (not shown) which engage perforations 49, located solely along the inner surfaces of the channel bars 44 and 45 thereby preventing the roof cover 32 from being wound on the roller 34 and maintaining the roof cover of the car in any desired position. The prongs are retracted by means of a release (not shown) e.g. a spring release located in the handle 37, to enable the roof cover to be moved in a forward or rearward direction. It will be understood that the passenger and/or cargo section may be covered or exposed either manually or automatically.

As mentioned previously, the channel bars 44 and 45 are sectioned and hinged at each support post, as indicated at 50 in FIGURE 4, so they may be folded parallel against the adjacent roof frame support posts after the roof cover has been cleared from that portion of the channel bar construction. This folding is exemplified in FIGURE 5. The roof cover support post with the channel bars folded parallel against it may in turn be lowered, as indicated by arrows, in FIGURE 5 into the tubular members 13 and 14 between doors in the sidewall of the vehicle.

Figure 5:
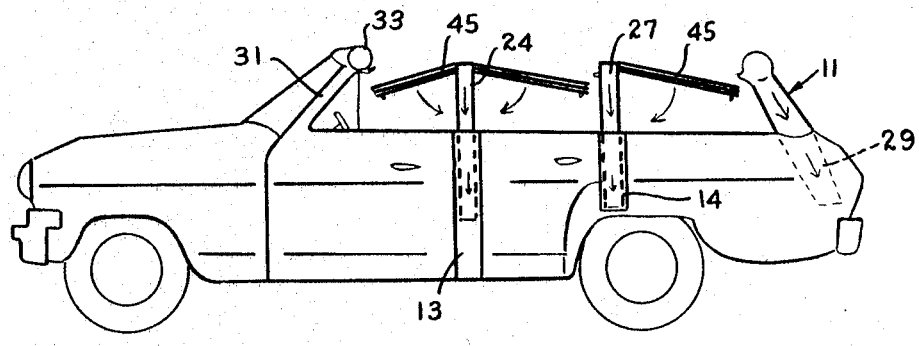
FIGURE 5 is a side elevation of the vehicle showing the channel bars folding against the roof frame support posts and the tubular members in which the roof frame support posts retract.
Figure 6:
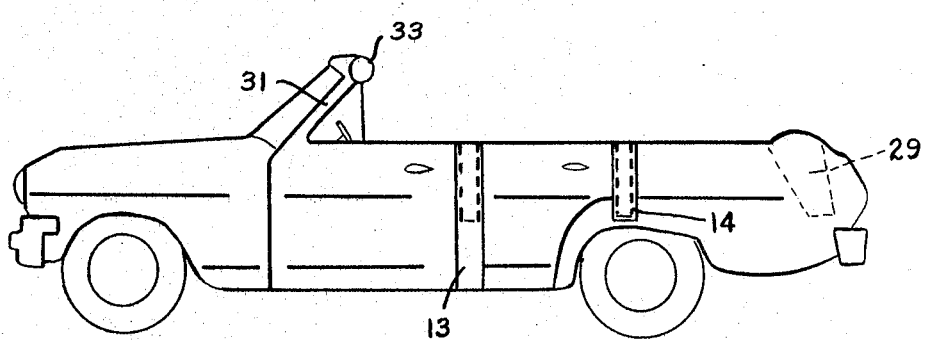
FIGURE 6 is a side elevation of the vehicle with the top completely lowered and the roof support posts fully retracted.

When all of the channel bars 44 and 45 have been folded against their respective roof frame support posts and all the side and rear roof support posts lowered into their respective tubular members, as indicated by arrows in FIG. 5, the station wagon will present the appearance of a conventional convertible vehicle as shown in FIGURE 6.

Figure 7:
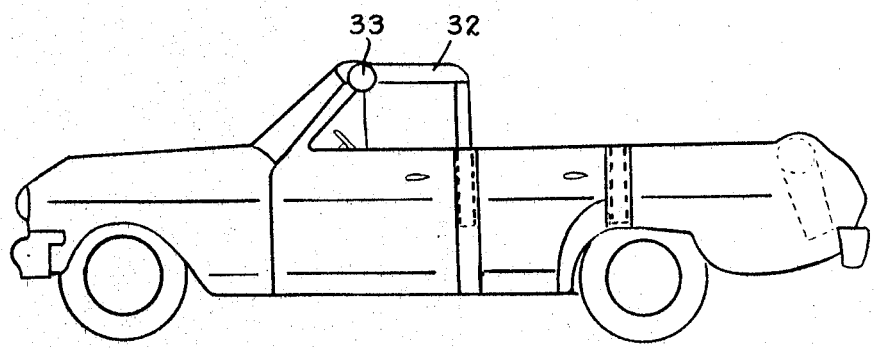
FIGURE 7 is a side elevation of the vehicle showing the roof roller housing mounted on the front windshield posts with the convertible roof partially extended.

In operating a vehicle according to the present invention, it will be apparent that it is possible to extend the roof cover 32 over the front section of the vehicle while leaving the rear section exposed as shown in FIGURE 7. This renders the vehicle useful for transporting goods which are too tall to be carried in a vehicle having a fixed roof, while at the same time providing shelter for the driver.

Figure 8:
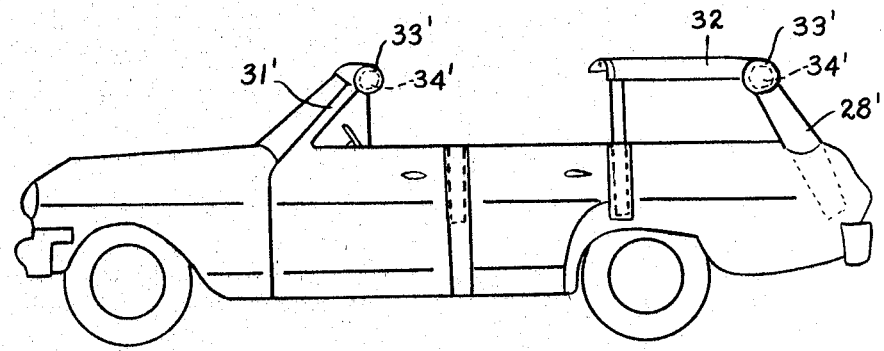
FIGURE 8 is a similar side elevation showing the roof roller housing mounted on the rear windshield posts with the convertible roof partially extended.

In an alternative embodiment, as shown in FIG. 8, the vehicle may have casings 33' supporting rollers 34' at the upper portion of both the front windshield and rear window posts 30' and 28', respectively. The roof roller may then be mounted on either the front windshield posts or on the rear windshield posts. By mounting the roller casing on the front windshield posts it is possible to cover with the roof cover 32 either the entire vehicle, or only a portion of the front thereof, thereby leaving the rear portion open as shown in FIGURE 7.

Likewise, by mounting the roof roller on the rear windshield posts, it is possible to cover with the roof cover 32 either the entire passenger and/or cargo section, or only the rear portion thereof, leaving the front portion open, as shown in FIGURE 8.

It is also possible to have more than one casing 33. For example, roller casings 33 may be mounted on both front and rear windshield posts. In this situation it is possible to attach the roof cover 32 to either the front or the rear roller. If attached to the front roller, all of the vehicle or any part thereof may be covered from the front as shown in FIGURE 7. By removing the roof from the front roller and switching it to the rear roller all of the vehicle or any part of the vehicle thereof may be covered from the rear as shown in FIGURE 8.

Alternatively, to avoid switching rollers, it is possible to have means e.g., snap fasteners on both the leading and trailing edge of the roof cover for attaching the roof to the roller. Thus, if the roof is mounted on the front roller it may be used to cover the vehicle from the front. Then, the leading edge may be fastened to the rear roller. Now, if desired, the trailing edge may be disconnected from the front roller and the roof cover wound upon the rear roller, thereby exposing the front portion of the vehicle. In this manner it will be observed that what had been the leading edge is now the trailing edge. In this embodiment, both edges of the roof cover will be provided with handles for grasping and moving the roof cover.

It is also possible to have multiple roof covers, each roof cover containing enough material to cover entire length of the vehicle; one roof cover mounted on the front roller and one roof cover mounted on the rear roller. In this manner the effects achieved above with one roof cover with front and rear rollers are accomplished without the necessity of disconnecting the roof cover from one roller and winding it up on the other. This also makes it possible to cover portions of the front and rear sections of the vehicle at the same time while leaving any desired area in between exposed. In this situation the leading edge of each roof cover may be provided with means, e.g., snap fasteners for joining the two roof covers.

A summary of the various possible roller and roof combinations is as follows:

(1) One single roller mounted on either the front or rear roller housing with one roof cover containing sufficient material to cover the entire length of the vehicle attached to the roller.

(2) Two rollers; one mounted on the front roller casing and the other on the rear with one roof cover, containing sufficient material to cover entire length of the vehicle, mounted on each roller, thus providing a total of two roof covers and two rollers.

(3) Two rollers with one roof cover. The roof, which contains sufficient material to cover entire length of vehicle has two handles, is capable of being wound from one roller to the other.

In still another embodiment, a movable partition may be incorporated into the back supports of the front seats. The partition, which may be of any flexible or rigid material, may be raised manually or automatically to join the at least partially extended roof cover, thereby completely enclosing the passenger section of the vehicle while permitting the remainder of the passenger and/or cargo section to remain exposed, if so desired, as shown in FIGURE 7. Glass is an eminently suitable material for the partition enclosing the passenger section of the vehicle. In this manner after the rear seats have been folded against the floor, or removed, a conventional pick-up truck is obtained. FIGURE 7 shows this arrangement.

Figure 9:
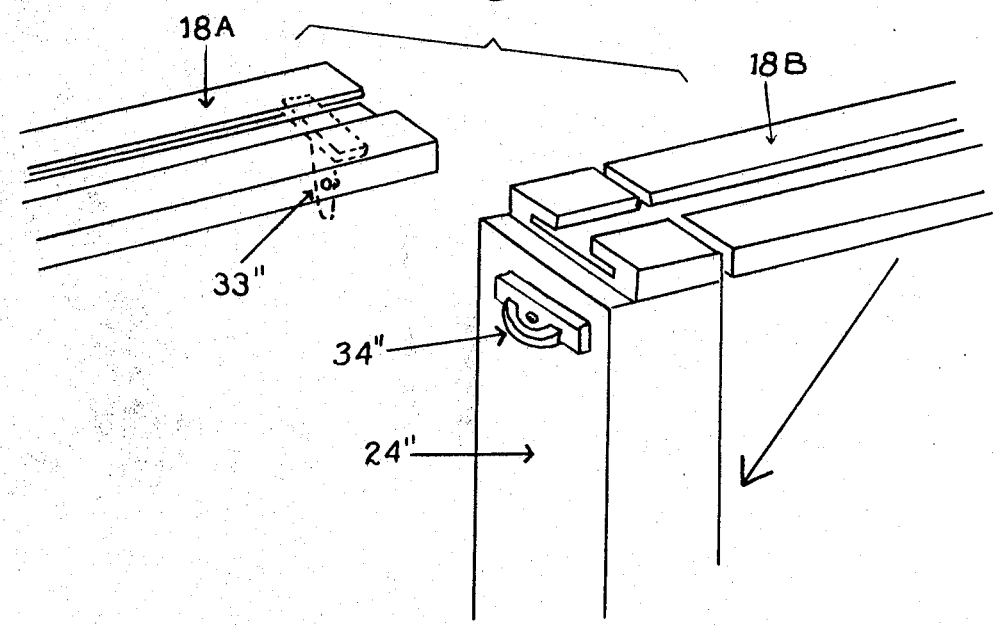
FIGURE 9 is a detail perspective view of the channel bars on which the roof rides.

FIGURE 9 is a detail drawing of a modified form of channel bar construction on which the roof cover rides. The channel bar construction 18A and 18B are sectioned on both sides of roof frame support post 24". Channel bar construction 18A is hinged at its end remote from post 24" and locks into post 24" by means of a snap 33" which fastens to lock 34" when the channel bar constructions are raised and locked in position to permit covering or exposing all or any part of the passenger and/or cargo section of the vehicle. Channel bar construction 18B is hinged at its end adjacent to post 24" and folds against post 24" as shown by the arrow.

Figure 10:
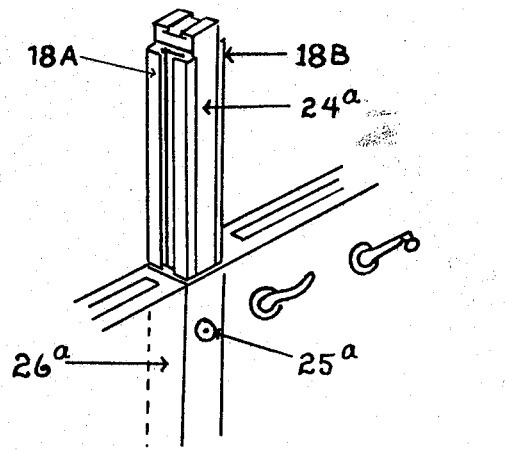
FIGURE 10 is a detail perspective view of a roof support post with the roof channels folded parallel against it.

FIGURE 10 shows a modified roof frame support post 24 with channel bar construction 18A and 18B folded parallel against the post 24a. Locking means 25a, e.g. a push button, maintains roof frame support post 24a in raised position. Releasing lock 25a permits roof frame support post 24a with attached channel bar constructions 18A and 18B to be lowered into a recess 26a in the side of the vehicle. All roof frame support posts can be operated in similar fashion.

An advantage of the present invention is that it permits all or any part of the passenger and/or cargo section to be covered or exposed as desired by the occupants. Thus, part of the vehicle could be covered to protect those occupants who wish to be shaded from the sun, while at the same time those passengers desiring to ride in the sunshine may do so.

Other advantages of the present invention are that it provides the facility and utility of converting a station wagon to a convertible or to a pick-up truck. The present invention provides one vehicle capable of doing the work of three, thereby affecting considerable saving to the purchaser.

It will be apparent that the present invention while useful as described for vehicles of the station wagon type is not limited thereto but is applicable to other vehicles and other types of vehicles as well. For example, a bus may be equipped with a convertible roof as described herein, and with removable seats, or seats capable of folding flat against the floor. Then by removing the roof, lowering the roof support posts and either removing or folding flat the seats, the bus may be converted into a large pickup truck.

Alternatively, to increase the cargo area, a custom made truck body may be attached to the body of the bus, after lowering the roof support posts and folding the seats flat. In this manner, there is provided a four way vehicle capable of functioning as a conventional bus, a convertible bus, a pickup truck and a conventional truck.

What I claim is:

A readily convertible multipurpose automotive vehicle comprising a body having sections for passengers and cargo, a roof frame around the top of the body, a windshield assembly at the front of the vehicle body extending to the roof frame, a window assembly comprising posts with a windshield interposed and mounted therebetween at the rear of the vehicle body, vertically-extending tubular members on both sides of the body, depending posts vertically adjustable in said tubular members, said frame having members hinged to the upper ends of said posts and adapted to be hinged down onto the sides of said posts and withdrawable with said posts into said tubular members, a hollow casing mounted across the top of the windshield, said casing having an elongated transverse opening, an elongated roller device in said casing, a flexible cover of sheet material wound around said roller and secured at the end of the roller, the free end of said cover projecting through the transverse opening in the casing and adapted to be drawn over the frame and connected to the rear window assembly, said roller with the cover sheet material being removable from the hollow casing, the rear of the body having a transverse recess therein, a casing mounted on the top of said posts of said rear window assembly, means mounting said assembly in said traverse recess for reciprocal vertical movement whereby said assembly and casing thereon are retractable into said recess, said roller device with the cover sheet material adapted to be mounted removably in the casing on the rear posts so that the cover can be stretched either from the rear casing to the opposed posts in the tubular members at the sides of the body or to the casing mounted across the top of the front windshield, said roller device being interchangeably adapted to be mounted in either the casing at the front or at the rear of the body for stretching the cover over the entire length of the roof.

References Cited by the Examiner

UNITED STATES PATENTS

| 242,796 | 6/1881 | Sheplie | 160—241 |
| 1,969,521 | 8/1934 | Oman | 160—276 |
| 2,502,538 | 4/1950 | Stark | 296—85 |

FOREIGN PATENTS

| 426,146 | 6/1911 | France. |
| 21,203AD | 11/1914 | Great Britain. |
| 180,201 | 5/1922 | Great Britain. |

BENJAMIN HERSH, *Primary Examiner.*

C. C. PARSONS, *Assistant Examiner.*